United States Patent [19]

Mitchell

[11] Patent Number: 5,542,532

[45] Date of Patent: Aug. 6, 1996

[54] COMPACT DISC HOLDER

[76] Inventor: David C. Mitchell, 109 Allan Rd., West Barnstable, Mass. 02668

[21] Appl. No.: 549,460

[22] Filed: Oct. 27, 1995

[51] Int. Cl.⁶ .................................................. B65D 85/57
[52] U.S. Cl. ........................ 206/308.1; 215/329; 220/288
[58] Field of Search ............................ 215/329; 220/288; 206/307, 307.1, 308.1, 313

[56] References Cited

U.S. PATENT DOCUMENTS

| 5,101,972 | 4/1992 | Hunt et al. | 206/308.1 |
| 5,147,060 | 9/1992 | Lima et al. | 220/288 |
| 5,322,177 | 6/1994 | Coggings | 220/288 |

Primary Examiner—Jacob K. Ackun
Attorney, Agent, or Firm—Wolf, Greenfield & Sacks, P.C.

[57] ABSTRACT

A container includes an angled sidewall with a non-overlapping thread. A lid has a lid sidewall set at the same angle as the container sidewall. The angle is between 12° and 18° from vertical and creates a strong connection when the two pieces are screwed together. In one embodiment, the container is a compact disc holder capable of holding a compact disc free from interference and damage. A top piece (lid) of the compact disc holder screws down on a bottom piece but maintains pressure on the compact disc to hold the disc between a pedestal on the bottom piece and a stabilizer disposed on the top piece.

16 Claims, 4 Drawing Sheets

COMPACT DISC HOLDER

FIELD OF THE INVENTION

This invention relates to a plastic container for securely holding various types of objects, e.g., nuts and bolts, food and drink. Some uses may require that the container be water-resistant.

BACKGROUND OF THE INVENTION

Plastic is used in many packaging applications throughout many different industries. Large costs are incurred not only in raw materials to make the plastics, but also in the tools and machines used to form the plastics into the various required shapes. Injection molding and thermal forming are two different methods of forming plastics into various shapes.

Injection molding involves complex machines and dies which are used to shape the plastic. In order to create a particular container out of plastic, it is necessary that the die be designed. This die only makes one form of plastic piece. In other words, a different die is needed for a different object made from plastic. Injection molding tools are expensive since they have to totally encase the part being made.

Thermal forming is an alternate method of making a plastic part. In thermal forming, a die is also made in order to create a given plastic part. However, a thermal forming tool is only the shape of one side of the part being formed thereby making it easier to make and not as expensive as a die in an injection molding apparatus.

SUMMARY OF THE INVENTION

It is an object of the present invention to provide a securely closing enclosure for objects where the enclosure can be made by either an injection molding process or a thermal forming process. In accordance with the present invention, a circular lid is provided having a lid sidewall where the lid is provided sidewall is tapered at an angle between about 12° and 18° from a vertical. It has been determined that about 15° is a most effective angle. Further, the lid sidewall has at least two non-overlapping lid threads disposed therein. A container body is also provided having a circular opening of a dimension substantially the same as that of the circular lid. Further, the container body has a container sidewall where the container sidewall is also tapered at an angle between about 12° and 18° from the vertical. The container sidewall has at least two non-overlapping container threads disposed therein. The lid threads on the lid sidewall and the container threads on the container sidewall are of substantially the same pitch and quantity so that the lid can be screwed down onto the container. The lid threads and the container threads preferably have a depth in the lid sidewall and the container sidewall, respectively, which is a constant value at all points on the lid and container sidewalls. In such case, the circular lid and the container piece can be made from a thinner plastic and a lid screwed down onto the container body provides a securely closed container.

In another embodiment, an open container is provided which has a ring instead of a lid. A ring is similar to a lid, however, the ring does not have a top surface although the ring does have a sidewall and threads. The ring cooperates with the container piece to create a rigid opening edge by the cooperation of the threads when the pieces are screwed together.

In one embodiment, the above container is a compact disc holder for holding a compact disc in such a way that the disc is not subject to damage.

In a further embodiment, the compact disc holder includes a compact disc pedestal to keep the compact disc from being scratched or damaged. In addition, a stabilizer is used to keep the compact disc in place.

In yet another embodiment, the compact disc holder can be stacked. A stacking locator is disposed in the first upper surface of the top piece and a stacking receiver is disposed in the second lower surface of the bottom piece. The stacking locator and stacking receiver have substantially the same shape and size in order to be received by one another.

In still yet another embodiment, the bottom piece of the compact disc holder includes a flange which has a removable portion attached.

BRIEF DESCRIPTION OF THE DRAWINGS

These and other objects and many of the intended advantages of the present invention will be readily appreciated as the same becomes better understood by reference to the accompanying drawings, in which like reference numerals designate like or corresponding parts throughout, wherein.

DETAILED DESCRIPTION

Now, an enclosure which can be used to hold many different objects and which is easily formable with a thermal forming process will be described hereinafter with reference to the accompanying drawings.

Figure 1A:
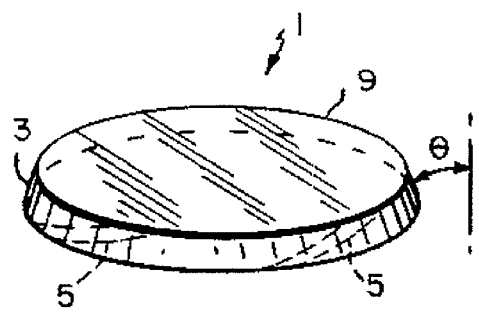
FIG. 1A is a perspective representation of a circular lid.

As shown in FIG. 1A, circular lid 1 is used as the cover of the enclosure. The circular lid 1 has a lid sidewall 3 which extends around the circumference of the circular lid 1. The lid sidewall 3 is set at an angle, θ, where θ is between 12° and 18° from a vertical. The angle θ is significant since it allows for easy removal of the circular lid 1 from a die used to make the circular lid 1. In addition, it has been determined that 15° is an optimal angle from vertical for this lid sidewall 3. An angle of 15° provides for easy removal from the forming die as well as for maintaining a close fit. At least one lid thread 5 is disposed in the lid sidewall 3. The lid thread 5 is set at a constant root depth into the lid sidewall 3. In other words, the lid thread 5 is at a same depth in the lid sidewall 3 at all points along the lid thread 5. This is true even though the lid sidewall 3 is set at an angle between 12° and 18° from vertical. In the present invention, the lid thread 5 does not overlap any other lid thread 5 on a same lid sidewall 3. The lid thread 5 extends through the lid sidewall 3 to a back surface. In other words, the underside is the gripping threaded surface.

The container 11 includes a container body 13 which can be of any size in order to accommodate items to be stored in the enclosure. The container body 13 has a container sidewall 15. The container sidewall 15 is set at an angle θ which is between 12° and 18° from vertical. A container thread 17 is disposed in the container sidewall 15. The container thread 17 is at a same pitch and number as that of a respective circular lid 1. In other words, in operation the circular lid 1 is screwed down onto the container sidewall 15 so that the lid thread. 5 and the container thread 17 interact and lock together. The container thread 17 is set into the container sidewall 15 at a constant root depth. Thus, similar to the lid thread 5 in the lid sidewall 3, the container thread 17 is at a constant depth at all points along the container thread 17 in the container sidewall 15. In addition, a number of non-overlapping container threads 17 is the same as the number of lid threads 5 in the associated circular lid 1.

In operation, a circular lid 1 is used in conjunction with an associated container 11. The circular lid 1 is set on the container 11 so as to cooperate with the container sidewall 15. The lid 1 is then screwed into place using an interaction of the lid thread 5 and the container thread 17. Once the lid 1 is fully screwed down, the enclosure is complete.

Figure 2A:
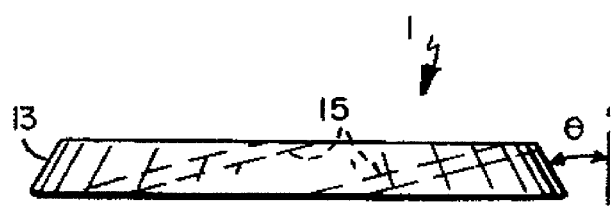
FIG. 2A is a side view of a lid.
Figure 2B:
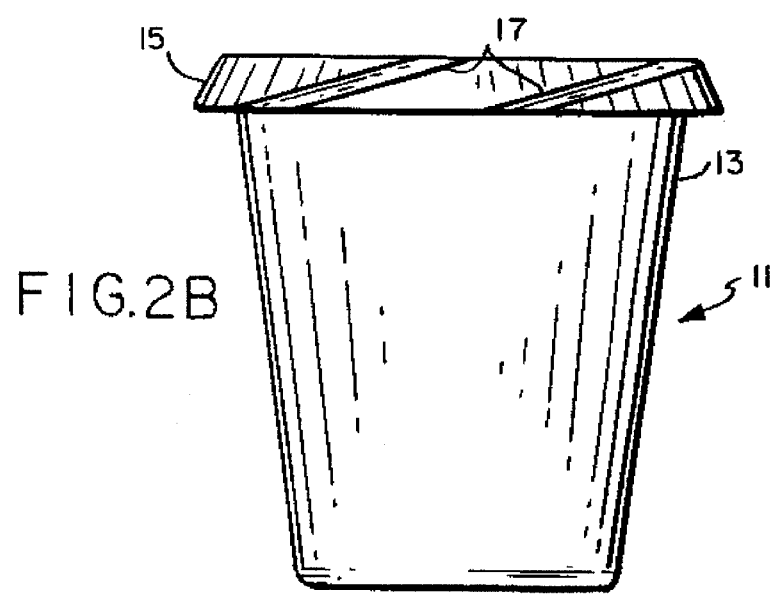
FIG. 2B is a side view of a container.

As shown in FIGS. 2A and 2B, the angle θ of the lid sidewall 3 and the container sidewall 15 must be within the same range of 12° to 18° from a vertical. It is not necessary, however, that the angle of the lid sidewall 3 and the container sidewall 15 be exactly the same value. It may be necessary, in some cases, to adjust the value of either the lid sidewall 3 or the container sidewall 15 in order to improve the fit. This could be due to either the characteristics of the plastics material being used or the desired characteristics of the enclosure, for instance, if it is necessary that the seal be either water-tight or gas-tight depending upon the desired application for the enclosure.

Figure 1C:
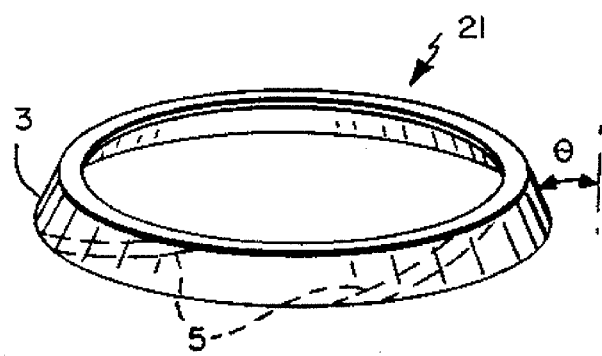
FIG. 1C is a perspective view of a lid ring.
Figure 1B:
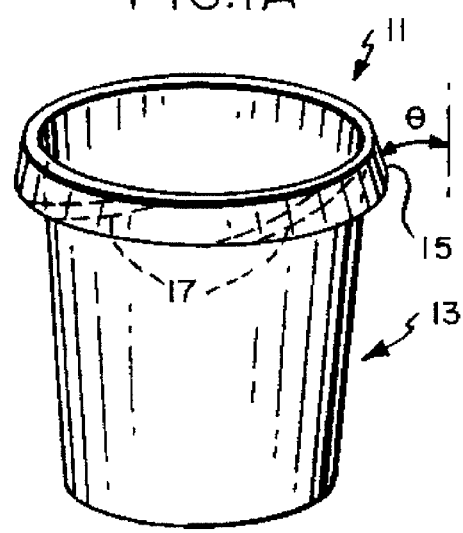
FIG. 1B is a perspective view of a container piece.

In another embodiment, an open container can be formed using the container 11 as described previously. Instead of the lid 1, however, a ring 21, as shown in FIG. 1C, is used. A ring 21, in effect, is a lid 1 without a lid surface 9. The ring 21 has all of the other characteristics of the lid 1 including the sidewall 3 at an angle between 12° and 18° from the vertical and the lid thread 5 set at a constant root depth in the lid sidewall 3. As shown in FIG. 1C, the lid thread 5 deforms the lid sidewall 3 to form the lid thread 5 on the inside of the lid sidewall 3. The ring 21 is screwed down onto the container sidewall 15 and screwed into place. The ring 21 functions to provide support to the container sidewall 15. As a result, the container 11, in this embodiment, is provided with a stronger opening edge. This facilitates the use of thinner plastic materials to make the container 11 where the rigidity of the container is maintained by the combination of the ring 21 and the interaction with the container sidewall 15.

Figure 9:
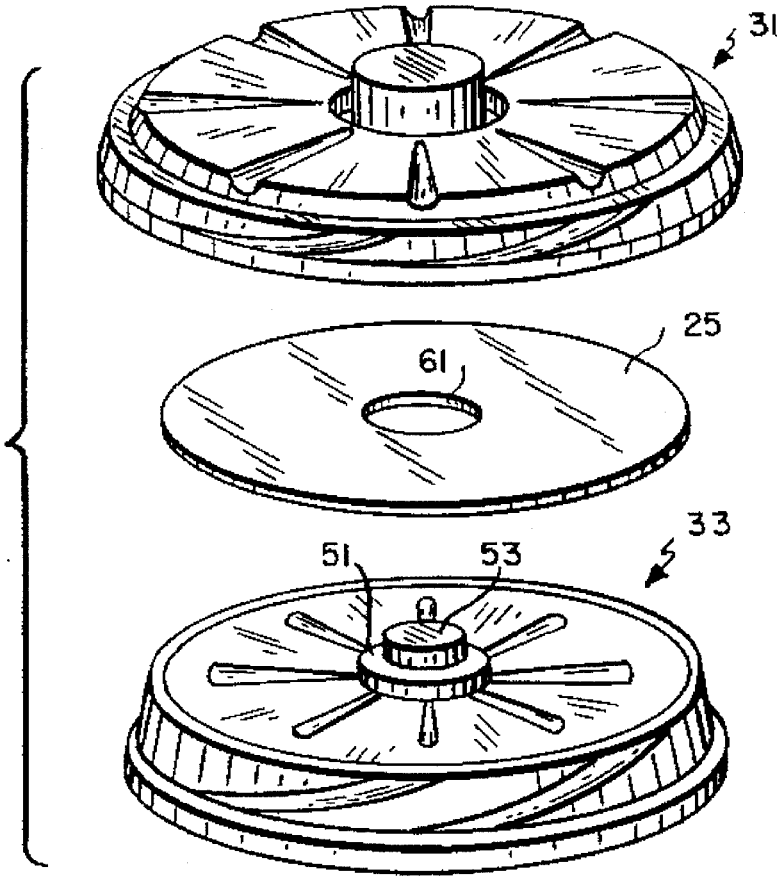
FIG. 9 is an exploded perspective view of a compact disc holder and compact disc.
Figure 10:
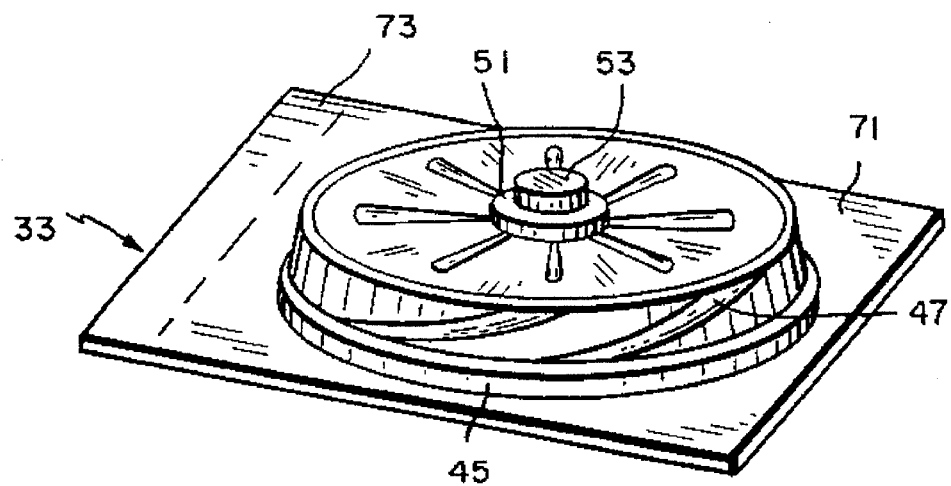
FIG. 10 is a perspective view of a bottom piece of a compact disc holder having a square flange.

In another embodiment, the present invention is used to implement a holder for a compact disc. The compact disc holder encloses a compact disc 25 between a top piece 31 and a bottom piece 33, as shown in FIG. 9.

Figure 3A:
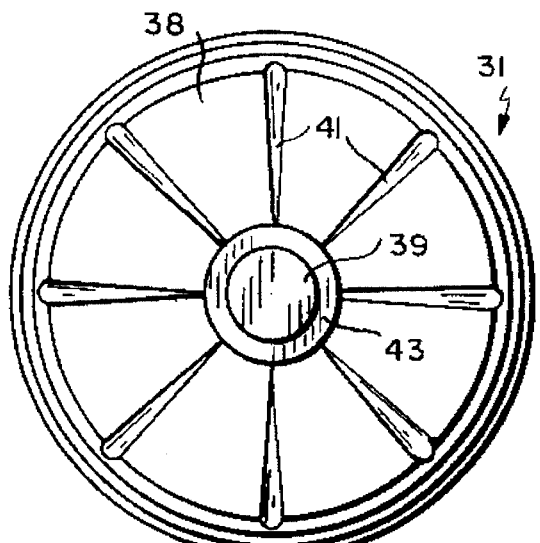
FIG. 3A is a top view of a top piece of a compact disc holder.
Figure 3C:
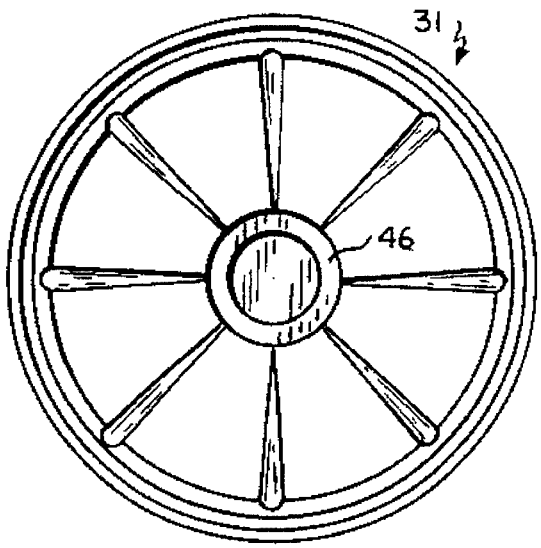
FIG. 3C is a bottom view of a top piece of a compact disc holder.
Figure 3B:
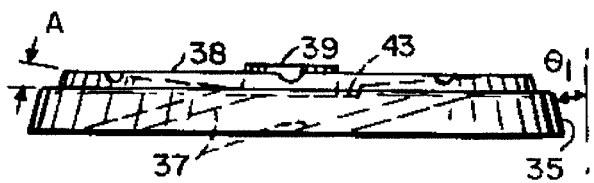
FIG. 3B is a side view of a top piece of a compact disc holder.
Figure 7:
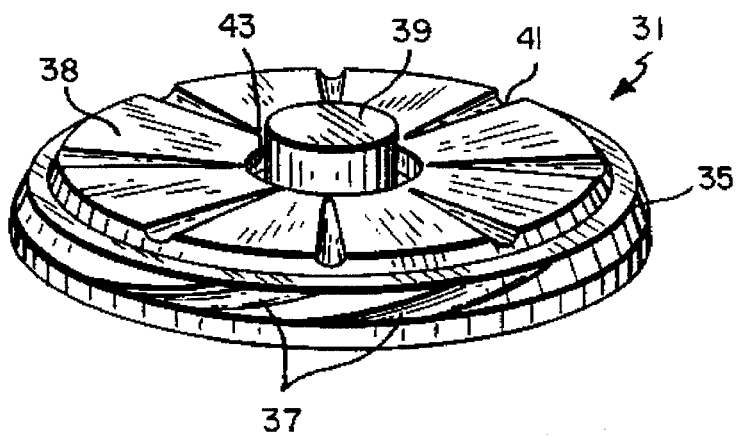
FIG. 7 is a perspective view of the top of a top piece of a compact disc holder.

The top piece 31 is circular and includes a top surface 38 and a top sidewall 35, as shown in FIG. 7. The top sidewall 35 is at angle $\theta_1$ which is between 12° and 18° from a vertical, as shown in FIG. 3B. The range between 12° and 18° from vertical is used since it is found to be advantageous in removing a top piece 31 from a forming die. A preferred value of 15° for the angle $\theta_1$ of the top sidewall 35 has been determined. At least two non-overlapping top threads 37 are disposed in the top sidewall 35. Each top thread 37 has the same root dimension in the top sidewall 35. In other words, a top thread 37 is at a same depth in all points of the top thread 37 relative to the top sidewall 35 even though the top sidewall 35 is at an angle from the vertical. As in the previous described embodiments, the top thread 37 deforms the top sidewall 35 to form an inner top thread surface.

Figure 8:
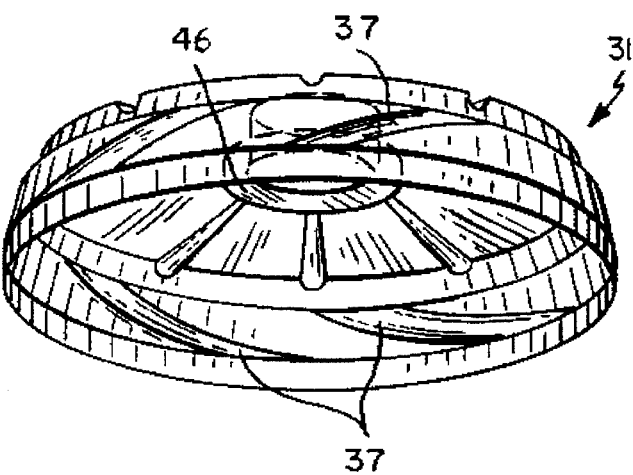
FIG. 8 is a bottom view of a top piece of a compact disc holder.

A stacking locator 39 is disposed in the top surface 38 to facilitate the stacking of more than one compact disc holder. Further, a locating groove 41 is located in the top surface 38 to locate one compact disc holder to another compact disc holder when stacked one upon another. An annular groove 43 is disposed in the top surface 38 around the stacking locator 39 which is located in the center of the top surface 38. The annular groove 43 causes a stabilizer 46 to be formed in the bottom of the top surface 38 as shown in FIG. 8. The stabilizer 46 could be formed by means other than the annular groove 43.

Figure 4A:
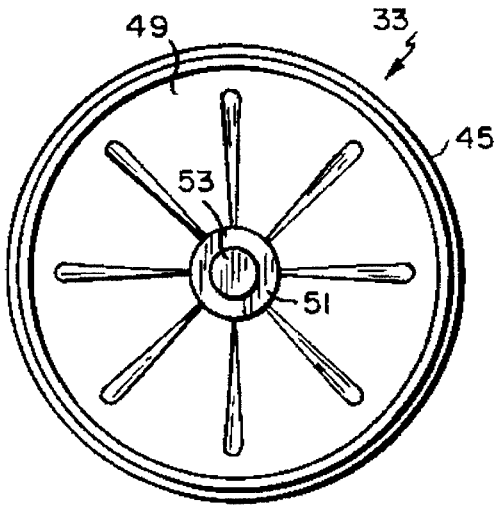
FIG. 4A is a top view of a bottom piece of a compact disc holder.
Figure 4C:
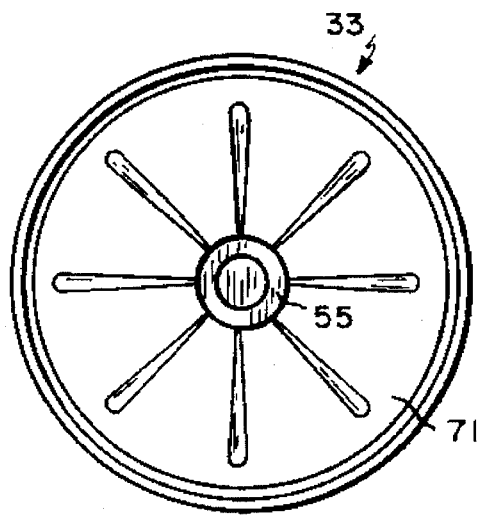
FIG. 4C is a bottom view of a bottom piece of a compact disc holder.
Figure 4B:
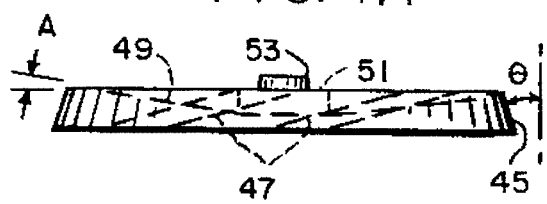
FIG. 4B is a side view of a bottom piece of a compact disc holder.
Figure 5:
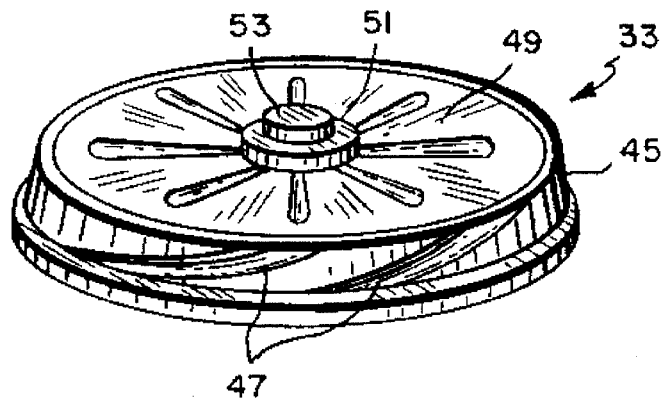
FIG. 5 is a perspective view of a bottom piece of a compact disc holder.
Figure 6:
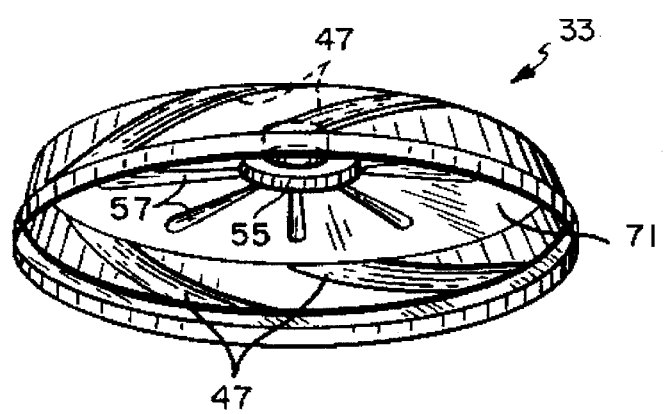
FIG. 6 is a perspective view of the bottom of a bottom piece of a compact disc holder.

The bottom piece 33 is preferably circular, although it could have a squared-off flange, and is of substantially the same dimension as an associated top piece 31, as shown in FIG. 5. The bottom piece 33 has a bottom sidewall 45 which is at an angle $\theta_2$ between 12° and 18° from vertical as shown in FIG. 4B. At least two bottom threads 47 are disposed in the bottom sidewall 45. Each bottom thread 47 has a same root dimension in that the bottom thread 47 is at a same depth at each point in the bottom sidewall 45 even though the bottom sidewall is at an angle between 12° and 18° from vertical. The bottom piece 33 includes a top surface 49. A CD pedestal 51 is disposed in the center of the top surface 49. A CD locator 53 is located on the CD pedestal 51. On an underside 71 of the top surface 49 of the bottom piece 33, a stacking receiver 55, as seen in FIG. 6, is disposed for receiving the stacking locator 39 disposed on a top piece 31. In addition, a locating rib 57 is also disposed in the underside 71 of the top surface 49 of the bottom piece 33 to interact with the locating groove 41 of a top piece 31 which is stacked below.

As shown in FIG. 4B, the top surface 49 of the bottom piece 33 can be slanted from the periphery toward the center of the top surface 49 at an angle of A°. Preferably, this angle is anywhere between 0° and 15° relative to a horizontal. This prevents the compact disc 25 from contacting the top surface 49. Further, the top surface 38 of the top piece 31 tapers down from the periphery to the center of the top piece 31 at an angle A which is also between 0° and 15° from a horizontal in order to coincide with an underside of the top surface 49 of the bottom piece 33 similarly angled. This facilitates the placement of one compact disc holder upon another in that the top surface 38 will interact more easily with the bottom piece 33.

In operation, a compact disc 25 is placed on the bottom piece 33 so that a center hole 61 of the compact disc 25 is positioned on the CD locator 53, as shown in FIG. 9. The compact disc 25 will then rest on the CD pedestal 51. The top piece 31 is then screwed into place over the compact disc 25 on the CD pedestal 51. The stabilizer 46 will hold the compact disc 25 firmly on the CD pedestal 51 when the top piece 31 is screwed into place. The CD pedestal 51 is of a height sufficient to keep the compact disc 25 from touching the top surface 49 of the bottom piece 33. In this way, the compact disc 25 will not be damaged. In addition, the height of the CD pedestal 51 will aid in removal of the compact disc 25 since a user will be able to easily grab the compact disc 25 with her fingers. Since the stabilizer 46 of the top piece 31 is holding the compact disc 25 against the CD pedestal 51, there is no movement of the compact disc 25 when the compact disc holder is fully closed.

In a further embodiment of the bottom piece 33, a rectangular or square flange 71 can be attached to the bottom side wall 45. The flange 71 can be used to provide additional packaging material for the compact disc holder. Further, the flange 71 could include a removable portion 73 which could be used, e.g., in a retail environment for either inventory control or as a shoplifting deterrent. In other words, at a point of sale, the removable portion 73 can be removed thereby disabling an anti-theft measure or providing inventory control. The removable portion is attached by a perforated section which makes removal easier.

One of ordinary skill in the art can see that the enclosure and the compact disc holder can be made from many different types of plastics, as well as either by thermal forming or injection molding. The compact disc holder can be made from a material that is either transparent or, as in the case of many musical compact discs, a design can be placed on the material. In addition, the top piece could be embossed with different designs or ornamentations.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than thus specifically described.

What is claimed is:

1. A container comprising:

a circular lid having a lid sidewall tapered at an angle $\theta_1$ from a vertical where $\theta_1$ is about 12°–18°;

the lid sidewall having at least two non-overlapping lid threads disposed therein;

a container body having a circular opening of a dimension substantially the same as a dimension of the circular lid and a container sidewall tapered at an angle $\theta_2$ substantially the same as $\theta_1$;

the container sidewall having at least two non-overlapping container threads disposed thereon;

wherein the lid threads and the container threads are of substantially a same pitch and quantity so that the lid can be screwed down onto the container body.

2. A container as recited in claim 1, wherein:

the lid thread and the container thread have a depth in the lid sidewall and the container sidewall, respectively, which is substantially a constant value at all points on the lid and container sidewalls.

3. A container as recited in claim 1, wherein:

the circular lid includes a lid surface.

4. A container as recited in claim 1, wherein:

the circular lid is a ring.

5. A container as recited in claim 1, wherein $\theta_1$ is approximately 15° from vertical.

6. A container as recited in claim 1, wherein:

there are four non-overlapping lid threads; and four non-overlapping container threads.

7. A compact disc holder, comprising:

a circular top piece having a first upper surface, a first lower surface and a first sidewall surface;

the first sidewall surface tapered at an angle $\theta_1$, from a vertical, where $\theta_1$ is about 12°–18° and having at least two non-overlapping top threads disposed therein;

a circular bottom piece having a second upper surface, a second lower surface and a second sidewall surface;

the second sidewall surface tapered at an angle $\theta_2$ substantially the same as $\theta_1$ and having at least two non-overlapping bottom threads disposed therein; wherein the top threads and the bottom threads are of substantially a same pitch and quantity so that the top piece can be screwed down onto the bottom piece.

8. A compact disc holder as recited in claim 7, wherein the top threads and the bottom threads have a depth in the first sidewall and the second sidewall, respectively, which is substantially a constant value at all points on the first and second sidewalls.

9. A compact disc holder as recited in claim 7, further comprising:

a compact disc pedestal disposed on the second upper surface;

a compact disc locator disposed on the compact disc pedestal; and a stabilizer disposed in the first lower surface of the top piece.

10. A compact disc holder as recited in claim 9, further comprising:

a stacking locator disposed in the first upper surface of the top piece; and a stacking receiver disposed in the second lower surface of the bottom piece;

said stacking locator and stacking receiver having substantially a same shape and size.

11. A compact disc holder as recited in claim 10, further comprising:

a locking groove disposed in the first upper surface; and a locking rib disposed in the second lower surface.

12. A compact disc holder as recited in claim 11, wherein:

four non-overlapping top threads are disposed in the first sidewall surface; and four non-overlapping bottom threads are disposed in the second sidewall surface.

13. A compact disc holder as recited in claim 12, wherein the second upper surface of the bottom piece tapers down from a periphery to a center point of the second upper surface at an angle A where A is about 0°–15°; and the first upper surface of the top piece also tapers down from a periphery to a center point of the first upper surface at an angle approximately the same as that of the second upper surface.

14. A compact disc holder as recited in claim 7, further comprising:

a flange on the circular bottom piece; and a removable portion removably attached to the flange.

15. A compact disc holder as recited in claim 7, wherein:

the top piece is a thermal-formed top piece; and the bottom piece is a thermal-formed bottom piece.

16. A container as recited in claim 1, wherein:

the lid is a thermal-formed lid; and the container body is a thermal-formed container body.

* * * * *